United States Patent
Brombach

(10) Patent No.: US 10,794,364 B2
(45) Date of Patent: Oct. 6, 2020

(54) METHOD FOR FEEDING ELECTRICAL POWER INTO AN ELECTRIC SUPPLY NETWORK

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 195 days.

(21) Appl. No.: 16/046,636

(22) Filed: Jul. 26, 2018

(65) Prior Publication Data
US 2018/0372074 A1    Dec. 27, 2018

Related U.S. Application Data

(63) Continuation-in-part of application No. PCT/EP2017/051777, filed on Jan. 27, 2017.

(30) Foreign Application Priority Data

Jan. 27, 2016 (DE) .......................... 10 2016 101 468

(51) Int. Cl.
*F03D 9/25*     (2016.01)
*H02J 3/38*     (2006.01)
*F03D 9/11*     (2016.01)

(52) U.S. Cl.
CPC .............. *F03D 9/257* (2017.02); *F03D 9/11* (2016.05); *H02J 3/386* (2013.01); *F05B 2270/337* (2013.01); *Y02E 10/76* (2013.01)

(58) Field of Classification Search
CPC .. H02J 3/386; F03D 9/11; F03D 9/257; Y02E 10/763; F05B 2270/337
See application file for complete search history.

(56) References Cited

U.S. PATENT DOCUMENTS 6,784,564 B1   8/2004   Wobben
8,378,514 B2   2/2013   Fortmann et al.
(Continued)

FOREIGN PATENT DOCUMENTS

DE           3632178 A1    3/1988
DE    102006050077 A1    5/2008
(Continued)

OTHER PUBLICATIONS

Karimi-Ghartemani et al., "A Signal Processing Module for Power System Applications," *IEEE Transactions on Power Delivery* 18(4):1118-1126, Oct. 2003.

*Primary Examiner* — Jared Fureman
*Assistant Examiner* — Duc M Pham
(74) *Attorney, Agent, or Firm* — Seed IP Law Group LLP

(57) ABSTRACT

A method for feeding electrical power, by a one wind power installation, a power plant or a generation plant, into an electrical supply grid is provided. The grid has a grid voltage having a grid frequency at a grid connection point. In the method a reference system having a reference frequency, a reference phasor having a reference angle, and a reference amplitude of an output voltage are specified. The reference angle revolves at the reference frequency and the reference frequency substantially corresponds to the grid frequency. A phase angle between the output voltage and the grid voltage is specified and an infeed angle is determined. The output voltage is generated having a voltage amplitude depending on the reference amplitude, a frequency depending on the reference frequency and the infeed angle. Tracking of the behavior of the grid voltage is delayed by the reference system.

23 Claims, 7 Drawing Sheets

(56) References Cited

U.S. PATENT DOCUMENTS

| | | | |
|---|---|---|---|
| 9,927,825 B2 | 3/2018 | Takaguchi et al. | |
| 10,072,634 B2 * | 9/2018 | Busker | F03D 7/048 |
| 2003/0155773 A1 | 8/2003 | Wobben | |
| 2006/0142899 A1 | 6/2006 | Wobben | |
| 2007/0086134 A1 * | 4/2007 | Zweigle | G01R 19/2513 |
| | | | 361/85 |
| 2010/0276930 A1 * | 11/2010 | Fortmann | F03D 9/257 |
| | | | 290/44 |
| 2011/0130889 A1 | 6/2011 | Khajehoddin et al. | |
| 2013/0002032 A1 | 1/2013 | Mori et al. | |
| 2014/0254216 A1 | 9/2014 | Diedrichs et al. | |
| 2014/0316592 A1 | 10/2014 | Haj-Maharsi et al. | |
| 2015/0148974 A1 | 5/2015 | Diedrichs | |
| 2016/0131109 A1 | 5/2016 | Busker | |
| 2016/0336888 A1 * | 11/2016 | Busker | H02J 3/24 |

FOREIGN PATENT DOCUMENTS

| | | | | |
|---|---|---|---|---|
| DE | 102007049251 A1 | 4/2009 | | |
| DE | 102011084910 A1 | 4/2013 | | |
| DE | 102013208474 A1 | 11/2014 | | |
| EP | 1790850 A1 | 5/2007 | | |
| JP | 2008172971 A | 7/2008 | | |
| JP | 2011092010 A | 5/2011 | | |
| JP | 2014090665 A | 5/2014 | | |
| JP | 2015223036 A | 12/2015 | | |
| WO | 9933165 A1 | 7/1999 | | |
| WO | 2014012789 A1 | 1/2014 | | |
| WO | WO-2014012789 A1 * | 1/2014 | | H02J 3/26 |

* cited by examiner

METHOD FOR FEEDING ELECTRICAL POWER INTO AN ELECTRIC SUPPLY NETWORK

BACKGROUND

Technical Field

The present invention relates to a method for feeding electrical power into an electrical supply grid. The present invention furthermore relates to a wind power installation for carrying out such a method and the invention also relates to a wind farm having a plurality of wind power installations for carrying out such a method, or a power plant or a generation unit having at least one wind power installation and a combination having stores, controllable consumers and/or other regenerative generators. The invention also relates to an arrangement of a plurality of wind power installations or a plurality of wind farms for feeding in at a plurality of grid connection points.

Description of the Related Art

It is known to feed electrical power into an electrical supply grid, such as, for example, into the European interconnected grid system, using wind power installations. For the feed-in, such wind power installations conventionally use frequency inverters, which are used to feed the electric current at the desired frequency and phase into the electrical supply grid directly or indirectly. This kind of feed-in thus deviates substantially from the kind of feed-in of conventional large power plants, which use a synchronous generator coupled directly to the electrical supply grid for the feed-in. Such synchronous generators coupled directly to the grid are intended to have a stabilizing effect on the electrical supply grid, which can also be referred to simply as grid for simplification.

Due to the increasing proportion of regenerative energy sources in the grid, particularly wind power installations, it is feared that said stabilizing effect by synchronous generators in the grid will be decreased.

In order to stabilize the electrical supply grid with the aid of wind power installations as well, methods are already known, in which the fed-in power is changed, for example, depending on the grid frequency or the grid voltage. As an example, reference is made to document US 2003/0155773 A1 for frequency-dependent power control of this kind and reference is made to WO99/33165 for voltage-dependent power control. Particularly for the support of the electrical supply grid by means of wind farms, it is also proposed that such a wind farm changes its fed-in power depending on external signals, which can be input, in particular, by the grid operator. In this regard, reference is made, for example, to US 2006/0142899 A1. Some of these proposals have already been partly incorporated into grid connection regulations.

However, such solutions are possibly not extensive enough, particularly when the large power plants with directly coupled synchronous generators still present in the electrical supply grid are declining in terms of their dominance, or in the most extreme case are disappearing completely.

Solutions to emulate the behavior of a synchronous generator have already been proposed for this. European patent EP 1 790 850 B1 proposes using an internal reference frame, which is implemented as an integrator and emulates a virtual inertia in order to provide a variable reference frequency signal.

However, even in the case of such solutions, stability problems in the grid can remain, become greater or reoccur. It should first be noted that also stabilization of the grid by synchronous generators does not consistently function in an ideal manner. Although the large degree of inertia of the synchronous generators provides, on the one hand, an equalizing and as a result at least partly stabilizing effect, it can also stand in the way of fast control. Grid oscillations are known, for example, where such synchronous generators of a plurality of large power plants can oscillate with respect to one another. It should also be noted that complete emulation of a large power plant would have to emulate not only the basic behavior of a synchronous generator but also the magnitude thereof, which can be indicated, in particular, by the respective rated power. Currently, a lot of wind power installations are required in order to achieve the rated power of a large power plant. Even wind farms having a plurality of wind power installations regularly have a considerably lower power than a large power plant. Also, at least the difference thus remains that wind power installations feed in in a manner much more markedly decentralized compared to large power plants.

The German Patent and Trademark Office has searched the following prior art in the priority application relating to the present application: DE 10 2006 050 077 A1, US 2003/0155773 A1, US 2006/0142899 A1, US 2011/0130889 A1, US 2014/0316592 A1, EP 1 790 850 B1, WO 99/33165 A1, and KARIMI-GHARTEMANI, M.; REZA IRAVANI, M.: "A Signal processing module for power system applications," IEEE Transactions on Power Delivery, vol. 18, no. 4, pp. 1118-1126, October 2003 (IEEE Xplore [online], DOI: 10.1109/TPWRD.2003.817514).

BRIEF SUMMARY

A method for providing grid support is disclosed.

A method for feeding electrical power into an electrical supply grid is proposed. The feed-in is performed here at a grid connection point and the electrical supply grid has a grid voltage and a grid frequency. Both the grid voltage and the grid frequency form in each case a state of the electrical supply grid. The feed-in is performed by means of a wind power installation and has the following steps: a reference system is specified, which has a reference frequency, a reference phasor having a reference angle, and a reference amplitude of an output voltage to be generated. Said reference system thus provides an orientation for the output voltage to be generated, which is generated, in particular, at the output of an inverter of the wind power installation. In the simplest case, the reference frequency, the reference angle and the reference amplitude corresponds to the frequency, the angle and the amplitude of the output voltage to be generated. The reference phasor is thus a voltage phasor of the output voltage. There may be a correlation between the reference amplitude and the amplitude of the output voltage by means of a constant factor, particularly also a normalization factor. The reference frequency should correspond as far as possible to the frequency of the output voltage, wherein deviations can arise due to dynamic or transient processes.

In other words, the reference system can be described in such a way that it has a reference phasor with a reference angle and a reference amplitude and said reference phasor revolves at the reference frequency. The reference angle changes accordingly with the reference frequency. The output voltage, which in the simplest case is identical thereto, is oriented thereto. The grid voltage can likewise also be defined by a revolving voltage phasor, which revolves at the grid frequency. When the generated output voltage corresponds to the reference system, that is to say can likewise be described by the reference phasor, the phase angle is the angle between the reference phasor and the voltage phasor of the grid voltage. The phase angle and, based on this, the operating point, can thus be set, inter alia.

The reference frequency should substantially correspond to the grid frequency. In the ideal stationary state, that is to say when the grid frequency does not change, the reference frequency should match the grid frequency. In the case of dynamic and transient processes, however, deviations can appear, which will also be further explained below.

If the grid frequency now changes, the voltage phasor of the grid voltage can drift and thus continuously diverge from or approach the voltage phasor of the output voltage, as a result of which the phase angle can increase or decrease. The reference phasor can be made to track the voltage phasor of the grid voltage in a delayed manner.

However, the amplitude of the voltage phasor of the grid voltage can also be increased or reduced. This then corresponds to an increase or decrease in the voltage amplitude. The reference system can also be made to track said voltage phasor of the grid voltage, in particular using the reference phasor.

As a further possibility for changing the voltage phasor of the grid voltage, it comes into consideration that the angle of said voltage phasor also changes suddenly. This can then occur when, for example, a large load, that is to say a large consumer, is disconnected from the electrical supply grid. As a result thereof, the angle of the overall impedance effective for a current path, which overall impedance is composed of the impedance of the feed-in unit, the grid impedance and the impedance of the consumer, also changes so that the angle of the voltage can also change accordingly. The voltage phasor of the grid voltage then accordingly jumps, in particular, in terms of its angle.

The reference phasor can then also be made to track said suddenly changing voltage phasor of the grid voltage.

Furthermore, a feed-in angle, which revolves with the reference angle, is calculated from the specified phase angle, such that the specified phase angle results as a phase angle between the output voltage generated with such a feed-in angle and the grid voltage of the specified phase angle when the reference frequency corresponds to the grid frequency. The method thus works so that an output voltage with a voltage phasor with the feed-in angle is generated. The phase angle is then set between the voltage phasor of the output voltage and the voltage phasor of the grid voltage. In a simple case, the reference system is selected so that the feed-in angle corresponds to the reference angle. The voltage phasor of the output voltage then corresponds to the reference phasor, at least in terms of its angle.

The output voltage is then generated accordingly, namely with a voltage amplitude depending on the reference amplitude, a frequency depending on the reference frequency and with the feed-in angle. In the simplest case, the voltage amplitude of the output voltage corresponds to the reference amplitude, and the frequency of the output voltage corresponds to the reference frequency, and the feed-in angle corresponds to the reference angle. This can hold true, particularly, for the stationary state. The stationary state is understood here to this extent at least to mean one in which the voltage amplitude, the frequency and the phase angle are constant.

If the behavior of the grid voltage now changes, in particular the grid frequency or, for example, also the grid voltage, the reference system is made to track said behavior. In the example of the frequency, this means that it is sought for the reference frequency to correspond again to the grid frequency. In the example of the voltage amplitude, that is to say the tracking by the reference amplitude, this can also mean, for example, that the reference amplitude does not exactly correspond to the voltage amplitude of the grid voltage, but is brought, for example, into a predetermined ratio. For example, the reference amplitude can be 10% above the voltage amplitude of the grid voltage. If, for example, the voltage amplitude of the grid voltage now decreases, the reference amplitude can be made to track in such a way that it is again 10% above the voltage amplitude of the grid frequency in order to remain in this demonstrative example.

However, said tracking by the reference system takes place in a delayed manner. It is therefore not sought for the reference system to track the behavior of the grid voltage as quickly and as well as possible but in this case the grid voltage is intentionally not followed immediately and directly. In this case, delayed tracking is thus provided, which goes considerably beyond the scope of physically necessary dynamics in terms of its delay.

This only delayed tracking by the reference system thus makes it possible to achieve a situation in which a change in the grid voltage with an unchanged output voltage leads to a corresponding reaction, in particular, of the fed-in current. Due to the delay, this reaction is thus not prevented, but is intentionally facilitated thereby.

If there is thus a lower grid voltage, for example, it can lead to an increased flow of current, that is to say an increased feed-in current. It can accordingly also lead to an increased fed-in power. The method proposes permitting such a resulting increase in power or increase in current. The feed-in can in this case be continued initially unchanged based on the reference system.

If there is a higher flow of power, the power required therefor can be taken from intermediate stores, such as, for example, a battery store, or from the flywheel mass of the rotating rotor of the wind power installation. The same applies analogously for a reduction in power. This is also initially permitted and the lower power consumption can be effected by intermediate stores of the corresponding power in intermediate stores, such as, for example, battery stores, the power production of the wind power installation can be reduced, particularly by pitching the rotor blades and/or the additional power can be delivered, where appropriate. It also comes into consideration that the power is used for storing rotation energy in the rotor of the wind power installation.

It is thus possible to achieve an immediate reaction to a change in the grid voltage in a simple manner because the directly resulting physical reaction is utilized.

A change in the grid voltage can in this case also be, for example, a change in the grid frequency, which can lead to an increase in the phase angle, for example. This will also lead to a change in the feed-in current, which can also increase, for example, in terms of its current amplitude. A change in frequency in the grid can then immediately and directly lead to a correspondingly changed feed-in current, without this having to be detected and evaluated beforehand by the feeding-in wind power installation. In another case, a reduction in the phase angle can also likewise result, which can lead, inter alia, to a reduction in the fed-in current.

The proposed measures are preferably carried out using at least one wind power installation or a wind farm. However, a power plant or a generation unit is also considered, which has at least one wind power installation and a combination having stores, controllable consumers and/or other regenerative generators or is designed as such a combination.

The delayed tracking is preferably effected using predetermined delay dynamics. As a result, the reaction, in particular, of the fed-in current to such a change in the grid voltage can be influenced. A greater delay can make, in particular, a greater compensation reaction possible and vice versa. If the grid voltage changes, that is to say, in particular, in terms of its amplitude and its phase in relation to the reference system, delayed tracking leads not only to a first compensation reaction, particularly a resulting change in the feed-in current, being permitted but it can also regularly lead to the deviation between the grid voltage and the reference system further increasing. The compensation reaction can then also increase again.

It is preferably proposed that additional power or resulting excess power from rotation energy required for the delayed tracking is offset or stored as rotation energy, and/or is drawn from an energy store, particularly a battery store, or is stored in such an energy store, particularly a battery store. An appropriate battery store can be provided for this purpose.

The delay dynamics are preferably realized by means of a delay function and the delay function can be a PT1 function or a PT2 function having a non-overshooting step response. Similarly well-attenuated functions are also considered. A PT1 function is also referred to as a delay function of the first order. Said PT1 function has the advantage that it is very simple and, since it is a linear function of the first order, it has no overshoot. By way of said PT1 function, it is possible to achieve delayed tracking in a simple manner, without it promoting oscillations in the grid.

A PT2 function can also be referred to as a delay function of the second order. Compared to the delay function of the first order, said PT2 function has the additional advantage that it can begin with a shallow rise. Said PT2 function is preferably selected such that it does not oscillate, that is to say it reacts to a step response without an overshoot, that is to say it has only two real intrinsic values. It is thus possible to realize an entirely shallow rise at the beginning and hence an initial delay similar to the dead time, which can nevertheless transition into a steep rise. A steep rise of this kind is then possibly necessary in order that the reference system does not diverge too far from the grid voltage. After a certain initial delay, it is thus nevertheless possible to achieve fast tracking using such a function, without waiving the described desired effects in the process. It is possible to achieve a positive stabilizing effect in the grid by specifying a non-oscillating and hence overshoot-free function.

Delay dynamics can thus be set by means of such delay functions or they are set in some other way. The setting can be performed dynamically, for example depending on requirements, or else depending on other feeding-in units in the grid, in particular also depending on how an expansion of regenerative feed-in units changes. Furthermore or alternatively, setting can also be performed depending on where the grid connection point is located in the grid. It is proposed, in particular, that such setting depends on whether the grid connection point is arranged centrally or decentrally in the grid.

The delay function can also be used to set how many or how quickly or how slowly an instantaneous reserve is to be provided or how quickly a power is to be changed or how quickly there is a return to the rated active power. It is preferably proposed that such instantaneous reserve provision or such a change in power is higher at a central grid connection point than at a decentral grid connection point.

It is preferably proposed that, for the delayed tracking of the grid frequency, an actual phase angle between the generated output voltage and the grid voltage is detected, a difference angle between the specified phase angle and the detected phase angle is formed, the reference angle is changed in such a way that the difference angle is reduced according to the magnitude using the delay function and the reference frequency is adjusted to the reference angle changed in this way. A deviation between the provided and the actual phase angle is thus detected. The delayed tracking by the reference system then relates initially to the tracking by the reference angle, in order to thereby bring the phase angle back to the desired phase angle. The resulting change in the reference angle is then used to adjust the reference frequency. If, like in one case, the change in the phase angle were to be ascribed to a change in frequency of the grid voltage, the phase angle would become continuously greater. The tracking also at least results in the phase angle not increasing further. When this is the result, however, the changed reference angle revolves at the grid frequency. It is precisely this that is utilized to adjust the reference frequency. It is thus possible to redetermine the reference frequency anew from the changed reference angle, or the changed feed-in angle. The reference frequency is thus also made to track the grid frequency in a delayed manner.

The reference frequency is preferably set to the grid frequency in a start setting, that is to say, in particular, when the method is started and the generation of the reference system is started. As soon as the reference system is then operating accordingly, it is possible to switch over to delayed tracking. The reference system thus runs, in principle, in an independent manner, except that it can be adjusted by means of the delayed tracking.

According to one embodiment, the method is characterized in that the generation of the output voltage produces a current fed into the supply grid and in that the delay function or delay dynamics is/are selected in such a way that, when at least one state in the supply grid changes, that is to say, in particular, the amplitude, frequency and/or phase of the grid voltage changes, the generation of the output voltage initially remains substantially unchanged so that a resulting change of the fed-in current initially is not substantially counteracted so that the method reacts to the change in the at least one grid state immediately with a changed fed-in current.

It is thus possible to achieve a situation in which the output voltage is initially retained so that the reaction to a change in a state in the grid directly and instantaneously is a changed current.

According to a further embodiment, it is proposed that at least one limit value specified in normal operation may be exceeded by a predetermined tolerance value in a tracking operation. In this case, a tracking operation is one in which the reference system is made to track the grid voltage and deviates in at least one variable from the grid voltage by a predetermined minimum deviation. It is only referred to here as a tracking operation when the deviation by which the reference system is to be tracked is significant. Otherwise, normal operation is assumed.

In this case, the basis is the knowledge of the fact that such a significant deviation will occur very rarely and that limit values, particularly for current, power and temperature, although in principle should be satisfied, a brief exceeding thereof, particularly when it occurs only very rarely, does not cause any considerable damage. To this extent, such exceeding of a limit value is also provided only for such a tracking operation when a predetermined minimum deviation from the grid voltage is present. Such a predetermined minimum deviation then indicates that the grid has a significant fault.

This permission of such limit value exceedances in exceptional cases makes provision for the reference system to be able to track the grid voltage in a delayed manner. Otherwise, immediate tracking or another restriction would possibly have to be performed in order to prevent such limit value exceedance. This measure thus also achieves a situation in which the compensation reactions described above are permitted and can in principle develop.

In particular, the following limit values are considered for this purpose. The specified limit value can be a maximum feed-in current and the predetermined minimum deviation can be at least 10% of the maximum feed-in current. A further possibility is that the specified limit value is a maximum power to be fed in and the predetermined minimum deviation is at least 10% of the maximum power to be fed in. In these two variants, it is thus possible to feed in at least using 110% of the maximum feed-in current or 110% of the maximum power to be fed in.

It is also considered that the specified limit value is a maximum permissible temperature of an inverter that generates the output voltage and that in this case the predetermined minimum deviation is at least 10 K (kelvins). An excessive temperature increase of 10 K above a limit value can constitute a considerable load for the relevant device, with the result that such limit values have to be satisfied. In this rare exceptional case that this overshoot is short and very rare, it is, however, possible to accept such an excessive increase.

It is also considered that the specified limit value is a maximum permissible value of an integral of the temperature over the predetermined time and the predetermined minimum deviation is at least 10 K*s. Particularly in the case of a temperature increase in semiconductor components, it can come down to the duration of the excessive increase. The higher the excessive increase, the shorter the time for which it may be permitted. For this, it is proposed to consider an integrated value of the temperature over time. For implementation, it is preferably based on a thermal inverter model.

Furthermore, the specified limit value can also be a maximum change in frequency and the predetermined minimum deviation can be at least 0.5 Hz/s.

Such a tracking operation is present only when the reference system is made to track the grid voltage and deviates in at least one variable from the grid voltage at least by a predetermined minimum deviation. Such a predetermined minimum deviation preferably relates to a deviation of the reference frequency from the grid frequency by at least 0.5% in relation to the rated frequency of the electrical supply grid. According to a further configuration, the predetermined minimum deviation relates to a deviation of the reference amplitude from the voltage amplitude of the grid voltage by a value of at least 10% of the rated voltage of the electrical supply grid, plus any difference, which is also provided in stationary operation between the reference amplitude and the amplitude of the grid voltage.

According to a further embodiment, the predetermined minimum deviation relates to a deviation of the measured or detected phase angle from the specified phase angle by at least 20°.

According to one embodiment, it is proposed that the reference frequency is made to track the grid frequency depending on whether the grid frequency approaches or diverges from the nominal frequency. Such a nominal frequency can be, in particular, a rated frequency of the relevant supply grid, that is to say 50 Hz for the European interconnected grid system and 60 Hz for the US grid, to mention just two examples.

To this end, it is also proposed that the tracking of the reference frequency is delayed to a greater extent when the grid frequency diverges from the nominal frequency than when said grid frequency approaches said nominal frequency. The reference frequency is thus made to track more quickly for changes in the direction toward the nominal frequency than if the frequency diverges from the nominal frequency. This proposal, that is to say the different delaying of the tracking, makes it possible to achieve a situation in which, in the case of tracking in the direction toward the nominal frequency, faster tracking leads to weaker compensation reactions. Furthermore, the reference frequency reaches the grid frequency, which moves fundamentally in a desired direction, more quickly. If the grid frequency changes away from the nominal frequency, that is to say diverges therefrom, it is sought to counteract this to the greatest extent possible by way of the greatest possible delay of the tracking of this tendency of the grid frequency to diverge.

According to one embodiment, it is proposed that the reference frequency is set to a value between the grid frequency and the nominal frequency. A reference frequency that deviates from the grid frequency is thus specified artificially here. Accordingly, a deviation between the reference system and the grid voltage results and compensation reactions can arise, which are also desired in order thereby to influence the grid frequency in the direction toward the nominal frequency. In particular, the present concept can be achieved here in a simple manner not only for tracking the output voltage of the grid voltage but also a positive influence can be exerted in a desired specified direction.

This can result in the inverter, which sets the output voltage, being able to specify the frequency itself. To the extent that said deviating frequency also leads, in particular, to significant changes in the phase angle, the delayed tracking can then start and, possibly, the reference frequency and the reference system overall can then match the grid voltage again.

A similar phenomenon also occurs in the case of feeding-in synchronous generators, which are directly coupled to such an electrical supply grid. Such synchronous generators then make their pole wheel angle or their pole voltage, which basically revolves like a voltage phasor, track said voltage phasor of the grid voltage in a purely physical manner. In this case, however, it often results in overshoots, caused, in particular, by the inertia of the respective synchronous generator. Frequency oscillations can therefore arise as a result.

In order to at least reduce this problem, a non-overshooting tracking function is preferably provided here. Such a non-overshooting tracking function, that is to say the delay function, is thus preferably proposed as a PT1 function, or as a PT2 function having a specified behavior, which does not overshoot. These are two simple functions that can be described well; however, other functions can also be used in principle, wherein these are not intended to overshoot or at least intended to overshoot very little.

If the reference phasor is made to track a suddenly changed voltage phasor of the grid voltage and the reference frequency is derived therefrom in each case, this inevitably results initially in a change in frequency, for example an increase in frequency when the sudden change in the voltage phasor of the grid voltage has led to an increase in the phase angle. A sudden change of this kind can also occur without the grid frequency changing. During tracking, the reference frequency would then initially rise and then, when the reference phasor is made to track the voltage phasor of the grid voltage successfully, reduce again, in particular, to the grid frequency. If the tracking is performed here without overshoots, no oscillations occur at the reference frequency. The reference frequency increases once and then returns to the frequency value of the grid frequency without decreasing below it in the process, that is to say also without swinging in the other direction. At any rate, to this extent, another behavior can be achieved using the proposed solution than is known by a synchronous generator. This other behavior can arguably be referred to as better.

Furthermore, a method for controlling a plurality of wind power installations connected to an electrical supply grid at a plurality of grid connection points is proposed, wherein said wind power installations are prepared in each case for feeding in electrical power at one of the grid connection points. For these wind power installations, it is proposed to use a method for feeding in electrical power in accordance with at least one embodiment described above. This can result in this plurality of wind power installations being able to contribute to grid support and together, particularly when very many wind power installations are operated in this way, being able to make a significant contribution. The method for feeding in electrical power in accordance with at least one of the embodiments described above is suitable, in particular, due to the delayed tracking by the reference system, for a plurality of wind power installations reacting in a similar manner to a change in the grid.

Particularly when many wind power installations initially permit a compensation process or output reactions to a change in the electrical supply grid, there is also the chance that the compensation reactions make an impact and, particularly, can compensate for a changed power situation in the electrical supply grid or, in particular, can return the grid voltage to a previous state.

According to one embodiment, it is proposed that a location property is initially determined for each of the plurality of grid connection points. This location property is used as a measure for a functional position of the grid connection point in relation to a coupling strength of the respective grid connection point for the electrical supply grid. This location property thus indicates how strongly or weakly the grid connection point is coupled to the electrical supply grid. The strength of the coupling indicates how strongly changes in the electrical supply grid affect the relevant grid connection point and vice versa. For example, the strength of the coupling can result from whether said grid connection point is arranged more centrally or decentrally in functional terms. However, it does not have to correspond to how central or decentral the grid connection point is.

This location property or the measure thus also indicates how this arrangement of the relevant grid connection point relates to other feed-in devices in the grid and consumers in the grid. In this case, in particular, how dominant the respective grid connection point is in its area of the grid is taken into account. The more dominant the grid connection point or the wind power installation or the wind farm of the grid connection point there is for the electrical supply grid, the stronger its coupling, in any case compared to grid connection points that feed the same or a similarly large amount of power into the grid.

It is then proposed to specify at least one operating setting in each case of at least one of the wind power installations depending on the location property of the grid connection point via which the at least one wind power installation feeds in. For the sake of simplicity, one wind power installation for each grid connection point can be assumed for the purpose of explanation. An operating setting of the wind power installation is then specified depending on its location property, that is to say the location property of its grid connection point. Such an operating setting relates, in particular, to properties of the wind power installation, which influence the feed-in, particularly properties, which relate to a reaction to changes of states of the electrical supply grid. Examples thereof are explained below. However, one wind farm, which comprises a plurality, in particular many, wind power installations, will often be assumed. A wind farm of this kind is also defined here by virtue of the fact that all of its wind power installations feed into the electrical supply grid via the same grid connection point. In this case, when there is a wind farm, in particular, when there is a wind farm at each considered grid connection point, said operating settings can each relate to a plurality of or all of the wind power installations of the same farm, that is to say of the same grid connection point.

The location property thus indicates how strongly the grid connection point is coupled to the electrical supply grid.

A rotational speed characteristic curve is preferably specified depending on the location property, namely in particular so that the rotational speed is greater, the more strongly the relevant grid connection point is coupled to the electrical supply grid. This can also depend, for example, on how centrally the grid connection point is arranged in the supply grid. The coupling is often, but not necessarily, stronger, the more centrally the grid connection point is arranged in the electrical supply grid. With the specification of a rotational speed characteristic curve with a particularly high rotational speed, rotation energy can therefore be stored in the rotor of the wind power installation. There is usually an optimum rotational speed at each operating point, particularly at each wind speed. Said optimum rotational speed can be increased in order to be able to provide more rotation energy accordingly as a result. In this case, a wind power installation can often be operated as optimal at a higher or lower rotational speed without significantly departing from the optimum point.

Although reactive power is also often fed in for grid support, it has now been identified that, in particular, little energy is required for grid support particularly at weakly coupled grid connection points of the electrical supply grid. In contrast, at a position of the grid connection point with strong coupling, more energy is often required and it is accordingly proposed to set a higher rotational speed there than in the case of a decentral grid connection point. In addition, too strong a reaction to weakly coupled grid connection points of an electrical supply grid can lead to oscillations, particularly grid oscillations. It is accordingly proposed to take this into account and to use less support or less support energy at weakly coupled grid connection points, that is to say feed-in points, which may also be decentral feed-in points. Insofar as advantages of taking account how centrally or decentrally a grid connection point is are explained here, these should also be understood as exemplary explanations of advantages of how strongly or weakly the coupling of a grid connection point is.

According to one embodiment, it is additionally or alternatively proposed to specify, depending on the location property, a permissible rotational speed band in which the rotational speed may be varied in order thereby to provide or deliver rotation energy, in particular so that the rotational speed band is wider, the more strongly the grid connection point is coupled to the supply grid. In this case, too, the basis is the knowledge of the fact that a relatively strong variation in rotational speed, particularly around an optimum rotational speed, has only a small effect on the power at the operating point. The rotational speed can thus be reduced by a predetermined value, particularly in order to deliver rotation energy, which results in only a low power loss of the new operating point to the previous one.

It is now proposed to permit such variations in the rotational speed to different degrees, namely depending on the location function of the respective grid connection point. It is thus possible to permit a high variation in rotational speed and hence a wide rotational speed band when the grid connection point has a strong coupling. A greater amount of energy from rotation energy is thus permitted than in the case of a grid connection point that is coupled more weakly. However, this also means that a more pronounced deterioration of the power of the new operating point is accepted in the case of the strongly coupled grid connection point than in the case of the more weakly coupled one.

The delay dynamics of the delayed tracking are preferably selected depending on the location property. This is effected, in particular, in such a way that the delay is greater, the more strongly the grid connection point is coupled to the supply grid. The greater the delay, thus the longer the delay, the more the compensation reaction is permitted. As a suggestion, this is also adjusted to how strongly or weakly the relevant grid connection point is coupled. If it is arranged to be coupled in a particularly strong manner, a stronger compensation reaction becomes expedient, and a greater delay is accordingly proposed here.

According to a further embodiment, stored energy is provided depending on the location property, namely in particular so that the stored energy is greater, the more strongly the grid connection point is coupled to the supply grid. It is also proposed here to implement the knowledge that more support energy may be required at a strongly coupled grid connection point.

Furthermore or alternatively, it is proposed that an energy store is provided depending on the location property. In particular, the energy store is intended to be greater, the more strongly the grid connection point is coupled to the supply grid. Accordingly, energy stores of different magnitudes are provided for different grid connection points. In this case, too, the concept is again based on more support being performed or being able to be performed at a position with strong coupling. A lot of energy may accordingly be necessary for this, for which energy stores of different magnitudes are provided accordingly.

According to one embodiment, it is proposed, particularly for the connection of two grid sections, to provide a high instantaneous reserve at a periphery of the supply grid, namely where the connection is intended to be carried out, in order to provide stabilization for this process of connection through the high instantaneous reserve.

According to a further embodiment, it is proposed that wind power installations that feed into the electrical supply grid via different grid connection points are connected via a data connection, which is configured to execute at least one of the tasks described below.

Control data are preferably transmitted in order to coordinate the feed-in at the different grid connection points. This can result in many wind power installations that themselves feed in via different grid connection points feeding in in coordinated fashion and hence also together, in particular, being able to make a large contribution for possible grid support measures.

The selection of the tracking dynamics of the wind power installations of the different grid connection points can preferably be coordinated by means of such a data connection. This can also result in the modes of behavior of the wind power installations also being dependent on their positions in the electrical supply grid. However, said modes of behavior can also be dependent on how the other wind power installations that feed into the same supply grid react. This can be performed, in particular, by means of setting the tracking dynamics, that is to say the selection of the tracking dynamics. In this case, it is considered, in particular, to select the time behavior of tracking functions.

According to a further embodiment, it is proposed that different tracking dynamics are specified for the wind power installations of different grid connection points. This is intended to intentionally prevent many wind power installations from reacting in the same way or as good as identically. There is then the risk that this leads to control oscillations. The intentional selection of different tracking dynamics can prevent such an overreaction.

A wind power installation for feeding electrical power at a grid connection point into an electrical supply grid having a grid voltage at a grid frequency is also proposed. Said wind power installation comprises:

a rotor having a plurality of rotor blades and a generator for generating electrical power from wind, a reference specification device for specifying a reference system having a reference frequency, a reference phasor having a reference angle, and a reference amplitude of an output voltage to be generated, wherein the reference angle revolves at the reference frequency and the reference frequency substantially corresponds to the grid frequency, a phase angle specification device for specifying a phase angle as the phase angle between the output voltage and the grid voltage, a calculation device for calculating a feed-in angle, which revolves with the reference angle, from the specified phase angle, such that the specified phase angle results as a phase angle between an output voltage generated at the feed-in angle and the grid voltage when the reference frequency corresponds to the grid frequency, a feed-in unit having at least one frequency inverter for generating the output voltage having a voltage amplitude depending on the reference amplitude, a frequency depending on the reference frequency and the feed-in angle for feeding the generated power into the electrical supply grid and a tracking device for the delayed tracking of the behavior of the grid voltage by the reference system.

The rotor with its rotor blades, of which there are preferably three, is thus rotated by the wind and this rotational movement generates the electrical power in the generator. For better control, it is proposed that the rotor blades are adjustable in terms of their blade angle.

Using the reference specification device, which can be provided, for example, as part of a process computer or can simply form a program or subprogram in a control system, a reference system is provided, particularly one of the kind that has already been described above.

The phase specification device can likewise be implemented as part of a process computer or simply as a subprogram in a control system. The phase angle specified here is also specified as the phase angle between the output voltage and the grid voltage, as has already been described above in connection with the method.

The calculation device for calculating a feed-in angle, which revolves with the reference angle, can also be implemented as part of a control unit, of the process computer or simply as a subprogram of a control system. Said calculation device thus calculates the feed-in angle, which revolves with the reference angle, as has already been described above.

A feed-in unit is provided for feeding in, which has at least one frequency inverter or else one frequency inverter. Said frequency inverter generates the desired output voltage, in particular, by specifying a corresponding pulsed voltage signal. This can be realized as pulse-width modulation or else as a tolerance band method. Said feed-in unit uses the reference amplitude, the reference frequency or a frequency dependent thereon and the feed-in angle as the input variables.

A tracking device for the delayed tracking by the reference system using the behavior of the grid voltage can likewise be implemented as part of a control device or as a subprogram of a control system. The tracking device preferably receives values of a detected voltage phasor of the grid voltage as input and makes the reference phasor of the reference system track using specified delay dynamics, in particular using a specified delay function. This can be implemented, in particular, so that setpoint values for the reference phasor can be formed directly from the values of the voltage phasor of the grid voltage and said setpoint values can then be delayed using the desired delay function. The setpoint values can thus form, for example, the input of a delay block of the kind that implements the delay function, and said block accordingly outputs the value delayed in this way. If said setpoint value changes suddenly, it is thus changed by the delay function so that it behaves like the step response of the delay function. This result is then the accordingly tracked value of the reference system, that is to say of the reference phasor.

The wind power installation is preferably prepared to execute at least a method as has been described above with respect to at least one of the embodiments of the feed-in method. To this end, the wind power installation can have a corresponding control apparatus in which the corresponding method is implemented.

The wind power installation preferably has a data transmission device, which is provided to exchange data via a data connection with at least one further wind power installation, wherein said further wind power installation itself feeds into the electrical supply grid via a further grid connection point. Such a data transmission device can take place in wired fashion or in wireless fashion. Where appropriate, a combination can be considered.

Furthermore, a coordination device is provided, which coordinates the feed-in of the electrical power of the proposed wind power installation with the feed-in of the electrical power of the at least one further wind power installation. To this end, coordination can take place, in particular, with respect to the provided dynamics. It is thus possible to coordinate which wind power installation tracks its reference system using which delay dynamics or delay function. It is also considered, however, to coordinate specific feed-in values, such as provided phase angle, for example. The coordination device can be provided as part of a control apparatus or be implemented as a control program in a control system, which receives the necessary data of the transmission device or transfers said data to said transmission device for the purpose of transmission.

For a wind power installation of the kind that is coupled to at least one further wind power installation via a data connection or communicates via said data connection, it is also proposed that said wind power installation executes a method, that is to say that such a method is implemented in the control device thereof, which method has been described above in connection with embodiments that relate to the feeding-in by means of a plurality of wind power installations via a plurality of grid connection points.

According to a further embodiment, for a wind power installation that communicates via a data transmission device with at least one further wind power installation that uses a further grid connection point, it is proposed that a determination device is provided for determining a location property or an input device for inputting a location property. The determination device can be part of a control device or it can also be a subprogram of a control system, which evaluates corresponding data. Alternatively, the location property can be input, for example, by service personnel or by a central control room to name just two examples. Said location property thus forms a measure of how strongly or weakly the respective grid connection point and hence the wind power installation using said grid connection point is coupled to the electrical supply grid.

A specification device is also proposed, which specifies at least one operating setting of at least one of the wind power installations depending on the location property of the grid connection point. The specification device can, for example, select a rotational speed characteristic curve and hence specify whether the relevant wind power installation is being operated at an optimum or even higher rotational speed. Furthermore or alternatively, the specification device can specify a rotational speed band, to mention a further example. The specification device can thus be part of the control device or it can be realized as a corresponding program or subprogram, by virtue of being implemented, for example, in the installation control system.

Furthermore, an arrangement of a plurality of wind power installations for feeding-in electrical power at a plurality of grid connection points is proposed. Said arrangement comprises at least one data transmission device for exchanging data via a data connection between the wind power installations, which feed into the electrical supply grid at the plurality of grid connection points. As a result, coordination between the wind power installations can be performed, in particular in the way as has already been described above in connection with embodiments.

Said arrangement preferably uses wind power installations in accordance with at least one embodiment described above. An arrangement of this kind further preferably implements at least one method in accordance with at least one embodiment described above and, additionally or alternatively, the arrangement is provided with energy stores, as above has already been described above in connection with at least one embodiment.

BRIEF DESCRIPTION OF THE SEVERAL VIEWS OF THE DRAWINGS

The invention is explained in more detail below by way of example on the basis of embodiments with reference to the accompanying figures.

DETAILED DESCRIPTION

Figure 1:
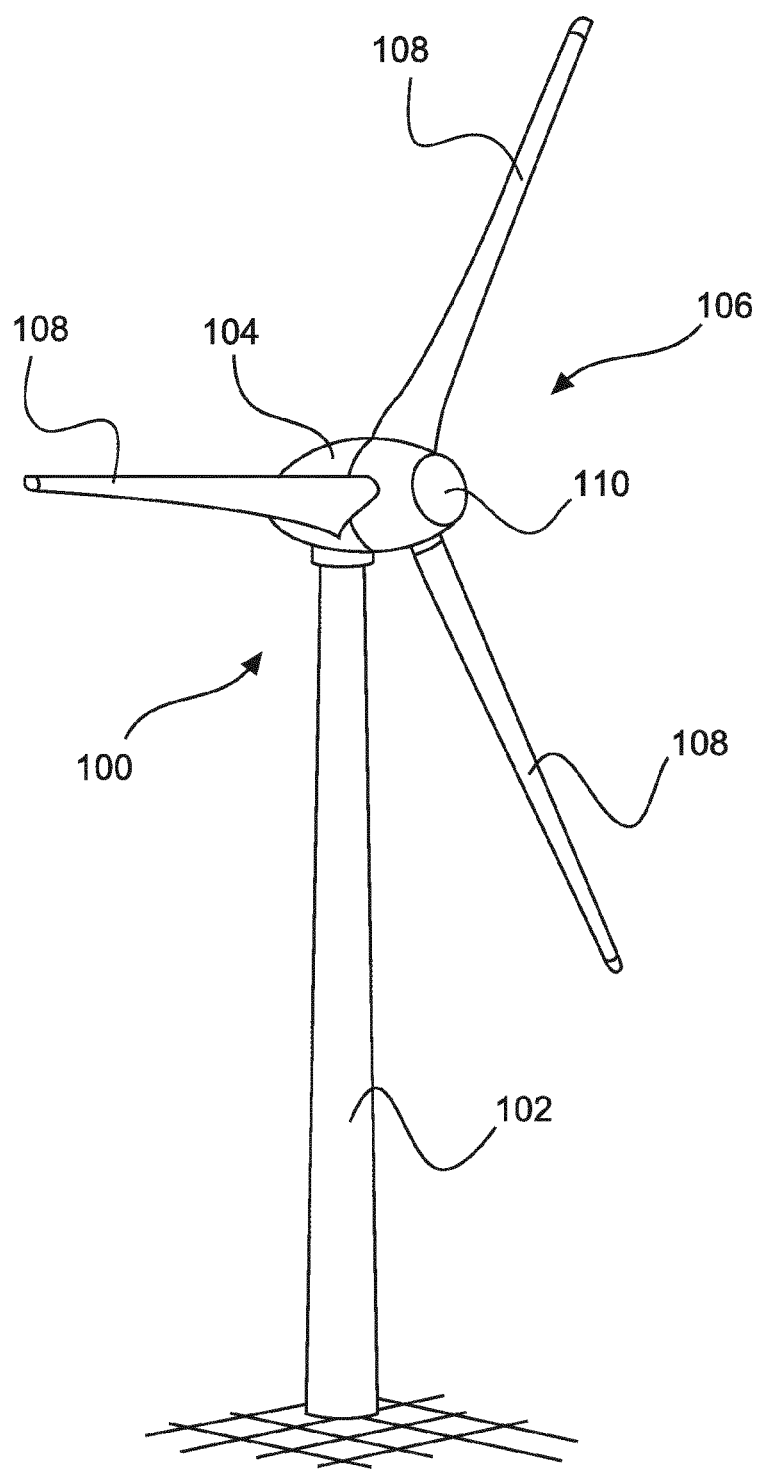
FIG. 1 shows a perspective illustration of a wind power installation.

FIG. 1 shows a wind power installation 100 with a tower 102 and a nacelle 104. Arranged on the nacelle 104 is a rotor 106 with three rotor blades 108 and a spinner 110. During operation, the rotor 106 is set in rotation by the wind and thereby drives a generator in the nacelle 104.

Figure 2:
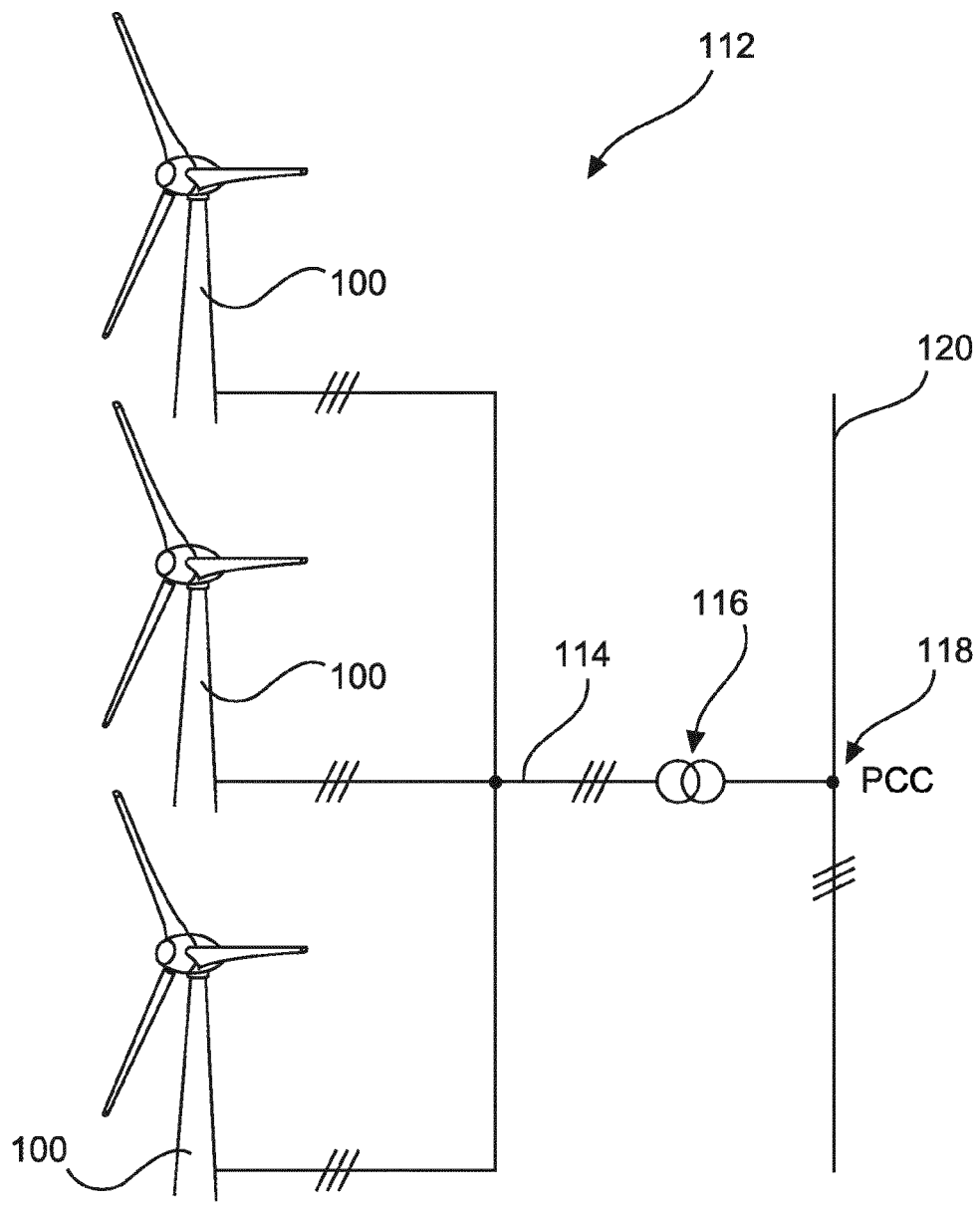
FIG. 2 shows a schematic illustration of a wind farm.

FIG. 2 shows a wind farm 112 having, for example, three wind power installations 100, which may be identical or different. The three wind power installations 100 are thus representative of basically any desired number of wind power installations of a wind farm 112. The wind power installations 100 provide their power, namely, in particular, the generated current, via an electrical farm grid 114. In this case, the respectively generated currents or powers of the individual wind power installations 100 are added together and a transformer 116, which steps up the voltage in the farm, is usually provided in order to then feed into the supply grid 120 at the feed-in point 118, which is also generally referred to as a PCC. FIG. 2 is only a simplified illustration of a wind farm 112, which does not show, for example, a control system, although a control system is present, of course. The farm grid 114 can also be designed differently, for example, wherein a transformer is also present, for example, at the output of each wind power installation 100, to mention just one other exemplary embodiment.

Figure 3:
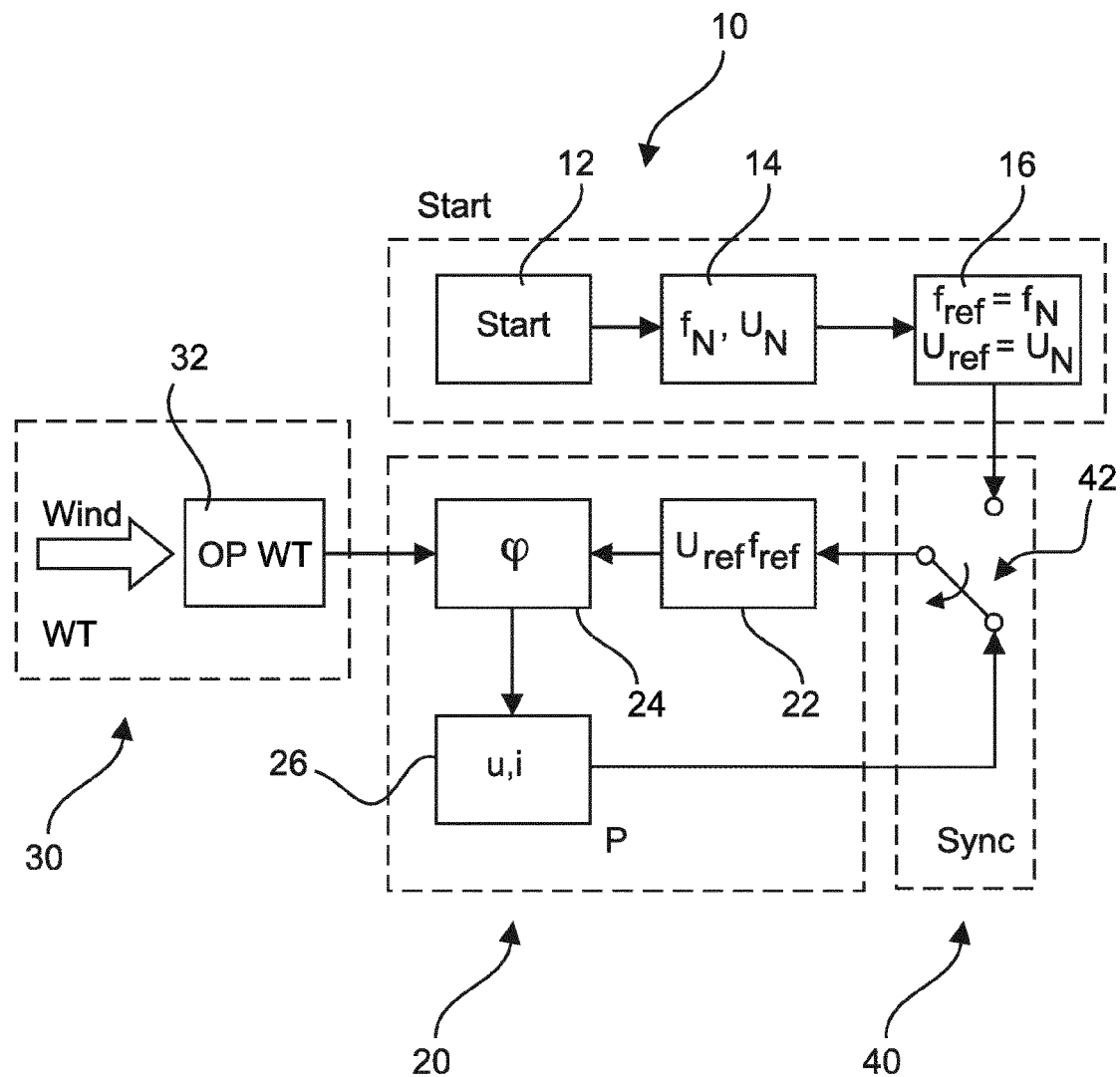
FIG. 3 shows a flow chart for operating a wind power installation according to one embodiment.

FIG. 3 now illustrates a block diagram of the procedure of one embodiment of a method according to the invention for feeding electrical power into a supply grid. In a start-up step 10, the start block 12 illustrates the start-up of the turbine, that is to say the wind power installation and the generator thereof. When enough wind is present, the wind power installation can in this case start up at rated rotational speed; it can otherwise start up at a lower rotational speed if necessary. If the wind power installation is then in this respect in operation, in measurement block 14, the grid voltage, namely at least the grid frequency $f_N$ and the amplitude of the grid voltage $V_N$, is measured. The initiation block 16, which initiates or starts a reference system, receives these values, namely in such a way that the reference frequency $f_{ref}$ corresponds to the measured grid frequency $f_N$ and that the voltage amplitude $V_{ref}$ of the reference system corresponds to the voltage amplitude $V_N$ of the grid voltage.

The feed-in can then be carried out using these start values in the power operation section 20. To this end, a reference system is operated in the reference block 22 and said reference block 22 accordingly delivers a voltage amplitude $V_{ref}$ and a reference frequency $f_{ref}$. In the reference block 22, tracking by the reference system can also be performed.

The reference block 22 then forwards said reference values to the phase angle block 24. The phase angle block calculates a phase angle in order to set an operating point. It is thus possible to set how much reactive power or reactive current and how much active power or active current is to be fed in here. The phase angle and the voltage can then be set.

The phase angle block 24 also receives information and, for transformation, energy from the wind power installation or the control system of the wind power installation, which controls, in particular, the generator and the rotor blades and an azimuth position. For this, the wind turbine region 30 is indicated in illustrative fashion. Said wind turbine region receives a wind turbine block 32, which controls the operating point of the wind turbine and transfers corresponding data to the phase angle block 24. The wind turbine block 32 thus relates to the control system of the generator and its periphery, whereas the power operation section 20 relates substantially to the feeding-in of the electrical power generated by the generator.

In the phase angle block 24, the phase angle is thus calculated in order to set the operating point and the result is then transformed by one or more involved inverters. This at least one inverter accordingly generates an output voltage and a resulting electric current is also set. This is intended to be illustrated in output block 26, which shows that an instantaneous voltage V is generated and an instantaneous current I is set. It is initially assumed that desired values are set, in particular, that the phase angle calculated in the phase angle block 24 is set. In this case, in the synchronization region 40, synchronization can then be established, namely, in that the starting values of the initiation block 16 apply, with the result that a synchronization switch 42, illustrated symbolically, can be switched over to the position shown in FIG. 3. The measured grid frequency $f_N$ and the measured voltage amplitude $V_N$ of the grid voltage now no longer determine the reference system directly, but the reference system runs substantially independently in the reference block 22. A closed circuit is accordingly present here in the power operation section 20, which circuit runs via the reference block 22, the phase angle block 24 and the output block 26 and back to the reference block 22.

If there is then a change in the supply grid, that is to say the voltage amplitude $V_N$ of the grid voltage, the grid frequency $f_N$ and/or the phase of the grid voltage change, this has an immediate effect at least on the instantaneous current I, which is illustrated in the output block 26. As a result of the fact that the reference system is not made to track immediately, particularly as a result of the fact that it is only made to track by a delay element of the first order, an instantaneous reserve is immediately activated and fed in, or withdrawn, depending on what change occurs in the grid and what reaction this causes. Delayed tracking then takes place, however, by virtue of the reference system being made, in the reference block 22, to track the changed situation or the changed states in the electrical supply grid using a specified delay function or delay dynamics. The mentioned reaction that arises can also lead to the phase angle φ calculated in the phase angle block 24 initially being changed. Said phase angle is then accordingly made to track using the mentioned delay function or delay dynamics. For this, a reference phasor of the reference system is made to track a voltage phasor of the grid voltage.

This tracking is then effected taking into account the delay dynamics, at least in such a manner that, ultimately, the reference phasor and the voltage phasor of the grid voltage revolve synchronously to one another but have the desired phase angle between them. If the reference phasor now revolves in a stationary manner, the reference frequency can be ascertained from this revolving and used in the reference block 22. In principle, the reference frequency is the derivation of the revolving reference phasor and/or its revolving angle. It may also be proportional thereto.

Figure 4:
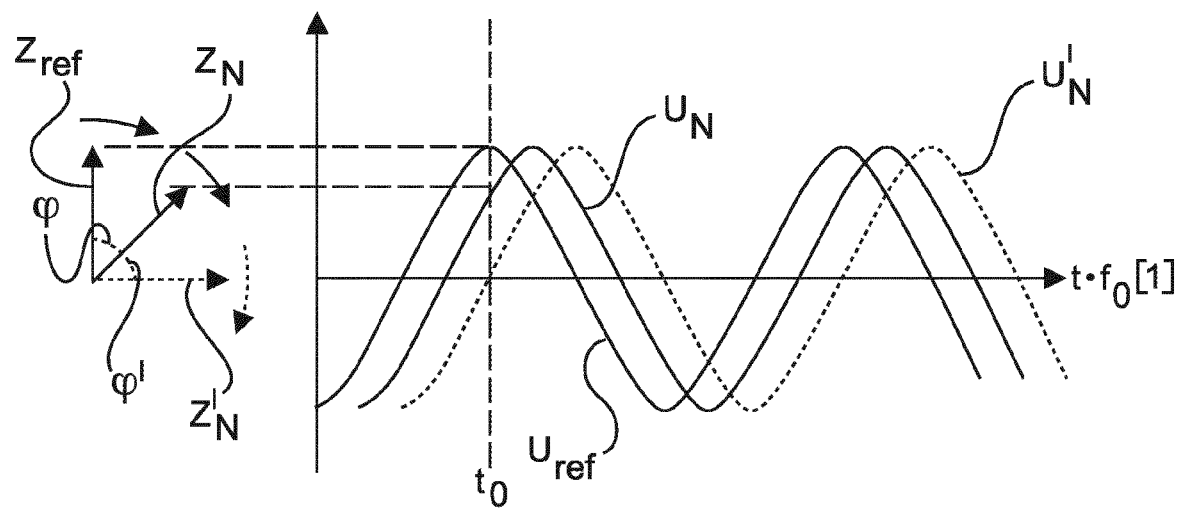
FIG. 4 illustrates the significance and tracking of a reference system with reference to a phasor diagram and an associated time function.

The significance of the reference phasor $Z_{ref}$ and of the voltage phasor $Z_N$ of the grid voltage is intended to be illustrated in FIG. 4. The illustration shows just one phase and that may be one phase of a three-phase system.

FIG. 4 initially takes one variant as a basis, in which the reference phasor $Z_{ref}$ of the reference system also corresponds to a voltage phasor of the output voltage, which is output by the inverter. FIG. 4 accordingly shows an approximately sinusoidal output voltage $V_N$ and an approximately sinusoidal grid voltage $U_N$. Furthermore, a changed grid voltage $V'_N$ is shown using dots, which will be explained more later.

The voltage profiles correspond to the revolving voltage phasors $Z_{ref}$, $Z_N$ and $Z'_N$. Said phasors revolve here in a clockwise direction and the phase angle φ lies between the voltage phasor $Z_{ref}$ of the reference voltage and the voltage phasor $Z_N$ of the grid voltage. Both phasors revolve in synchronous fashion and the phase angle φ is thus constant. The position of the phasors shown in FIG. 4 corresponds to the instantaneous values at the time $t_0$. In the stationary state, said phasors thus revolve continuously and the illustrated sinusoidal profile results over time. The phase angle φ is thus the phase shift between the two sinusoidal voltage profiles $V_{ref}$ and $V_N$.

If a change in the grid voltage then results, the voltage phasor $Z_N$ of the grid voltage also changes accordingly. It is considered here that the amplitude, that is to say length, of said voltage phasor changes, that is to say the revolution speed of said voltage phasor changes, with the result that the phase angle φ would gradually change when the voltage phasor $Z_{ref}$ of the reference system were to not change, and it is considered that the voltage phasor $Z_N$ of the grid voltage jumps in terms of its phase, that is to say that the angle φ immediately changes by a specific value. These three possibilities can also occur in combined form. FIG. 4 illustrates this last case, in which the phase of the voltage phasor $Z_{ref}$ of the grid voltage jumps. It namely jumps to the voltage phasor $Z'_N$ indicated using dots. The indicated jump of 45° is quite large and is therefore selected only in order that it can be illustrated well graphically.

This illustrated jump of the voltage phasor $Z_N$ to the new voltage phasor results in a changed phase angle φ'. The phase angle φ increased in this way can also be read in the timing diagram in which the dotted sinusoidal profile of the changed grid voltage $V'_N$ on the time axis has a greater shift in relation to the reference voltage $V_{ref}$. In order to reach this originally provided phase angle φ again, the voltage phasor $Z_{ref}$ of the reference system can be made to track the new voltage phasor $Z'_N$. However, said tracking takes place in a delayed manner, preferably delayed by a PT1 behavior.

Figure 5:
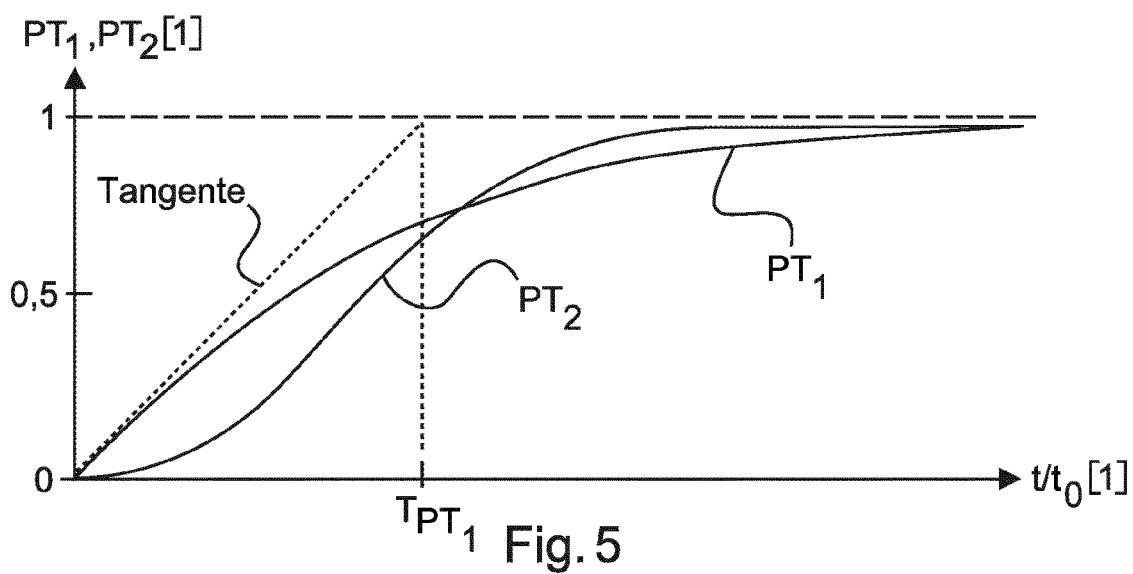
FIG. 5 illustrates the profile of a delay function of the first order and an overshoot-free delay function of the second order.

Such a delay function of the first order, which is also referred to as a PT1 function, is illustrated in FIG. 5, but should be familiar to a person skilled in the art. FIG. 5 shows in this respect a step response of a delay function of the first order PT1 at a gain of 1 and a jump from 0 to 1. The shown step response, which in this respect also characterizes this delay function of the first order PT1, starts at a starting gradient and then approaches the end value 1 asymptotically from below. The starting gradient is illustrated by a dashed tangent and the value at which the tangent reaches the end value can be considered as the time constant $T_{PT1}$ of said delay function of the first order. It is thus possible to easily specify a behavior that does not overshoot and wherein a time constant can also be specified at the same time in a simple manner. Said time constant is in this respect a measure for the delay of the tracking. The greater the time constant $T_{PT1}$, the greater the delay.

As the second embodiment, the delay dynamics one delay element of the second order without an overshoot is indicated as delay dynamics in FIG. 5 and is referred to there as PT2. This function starts with a shallow rise compared to the delay function of the first order, then becomes steeper and initially approaches the end value faster but also asymptotically from below. Said delay function of the second order PT2 can also be parameterized by means of a time constant and the attenuation behavior thereof. As a result, the magnitude of the delay can also be set.

FIG. 5 shows in this respect two preferred delay functions for the delayed tracking. Accordingly, functions that have a similar behavior are also useful functions for tracking within the meaning of the teaching described here.

Figure 6:
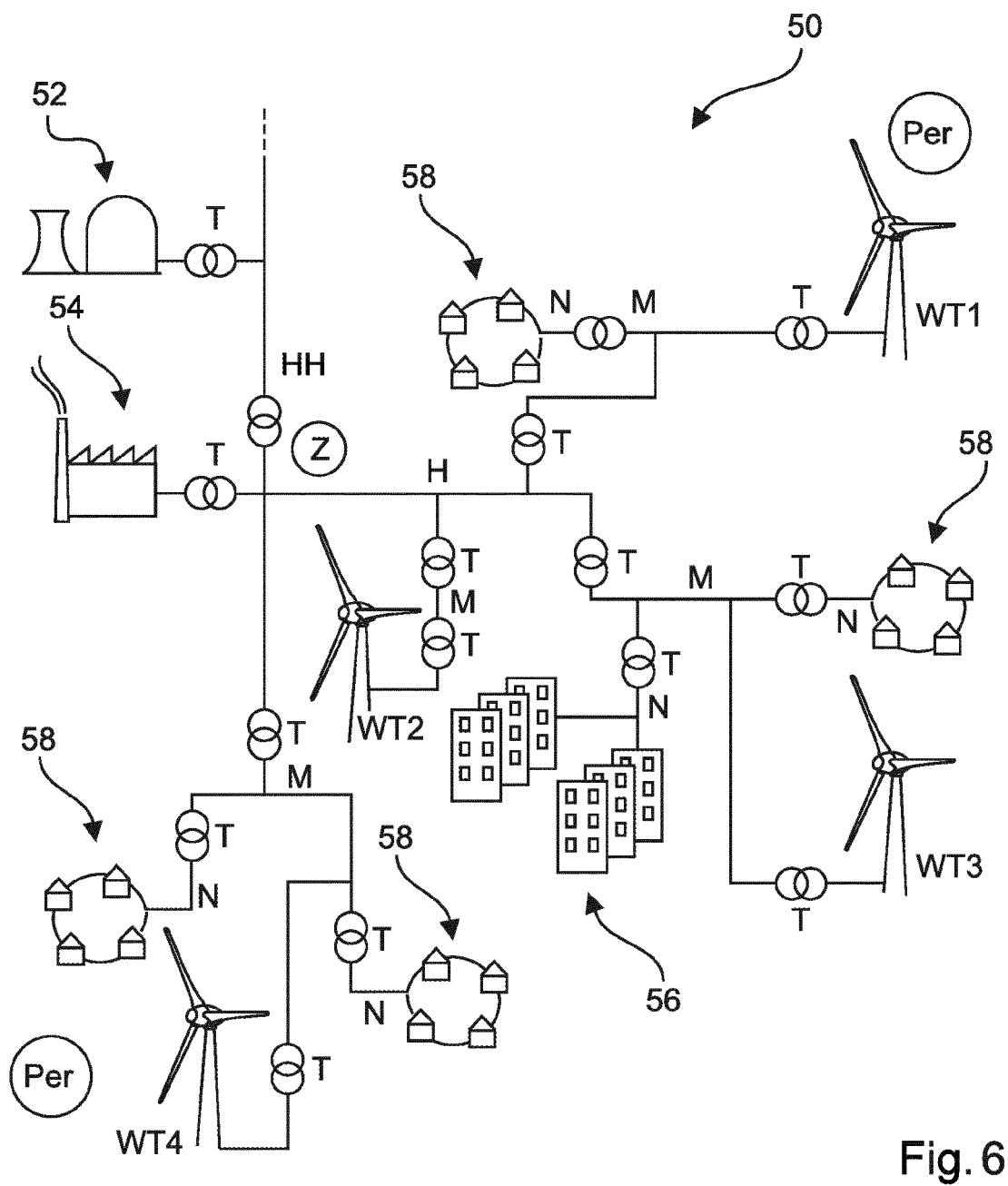
FIG. 6 schematically shows an example of a structure illustrating central and decentral regions.

FIG. 6 shows a schematic illustration of an electrical supply grid 50 and a part thereof. Said electrical supply grid 50 shows by way of example a large power plant 52, an industrial consumer 54 such as, for example, a steel works or another production facility and a town 56. Furthermore, various smaller localities 58 and four wind power installations WT1 to WT4 are indicated. The grid has different grid sections with different voltages, namely an ultra-high voltage grid HH, a high-voltage grid H, a plurality of medium-voltage grids M and a plurality of low-voltage grids N. Transformers T are arranged in each case between said different grids and to the large power plant 52, the industrial consumer 54 and the wind power installations WT1 to WT4. Both the transformers T and the localities 58 will not differ in terms of their reference numerals, although they are each of course of different designs in the specific case. The wind power installations or wind turbines WT1 to WT4 can also be representative in each case of a wind farm, which comprises in each case a plurality of wind power installations. The respective transformer T of one of the wind power installations WT1 to WT4 can also be considered as a grid connection point for the understanding of the teaching explained here.

In this electrical supply grid 50, the large power plant 52 constitutes a large generating plant with respect to the amount of energy delivered. The industrial consumer 54 constitutes in this context a large consumer. The town 56 likewise forms a comparatively large consumer and the localities 58 each form rather relatively small consumers. The wind turbines WT1 to WT4 can in any case be considered as relatively small energy generation units in comparison to the large power plant 52.

In normal operation, in particular when the industrial consumer 54 is being operated and the large power plant 52 is being operated as well, there is a significant flow of energy from the large power plant 52 to the industrial consumer 54 and a significant flow of energy from the large power plant 52 to the town 56. When the industrial consumer 54 changes its power consumption, particularly when it leaves the grid or is connected to the grid, this will have particularly significant effects on the wind turbine WT2. The same applies for changes of the large power plant 52, particularly if it should leave the grid.

Furthermore, grid support measures, that is to say, in particular, increasing or reducing the fed-in power of the wind turbine WT2, have a considerably less directly identifiable effect than, for example, for the wind turbine WT1, provided they are approximately the same size. The wind turbine WT2 is accordingly located particularly close to the center of the electrical supply grid 50. This center is also indicated here as "Z". Two regions are characterized by "Per" as two peripheries. This characterization of a center and a periphery should be understood, however, as demonstrative. In actual fact, the small dots on the ultra-high voltage line HH near the large power plant 52 indicate that the electrical supply grid is continued further there and there may consequently also be further centers. In this example, in particular, a coupling of the individual grid connection points with a different strength is intended to be indicated. To this end, it is assumed here, simplistically and only for the purpose of illustration, that the strength of the coupling of each grid connection point corresponds to how centrally it is arranged in the supply grid.

Nevertheless, in any case, for the wind turbines WT2 and WT1 already mentioned, a statement can be made about how central or decentral they are. The wind turbine WT2 is accordingly arranged very centrally and feeds into the supply grid 50 very centrally and the wind turbine WT1 is arranged very decentrally and feeds into the supply grid 50 very decentrally.

Figure 7:
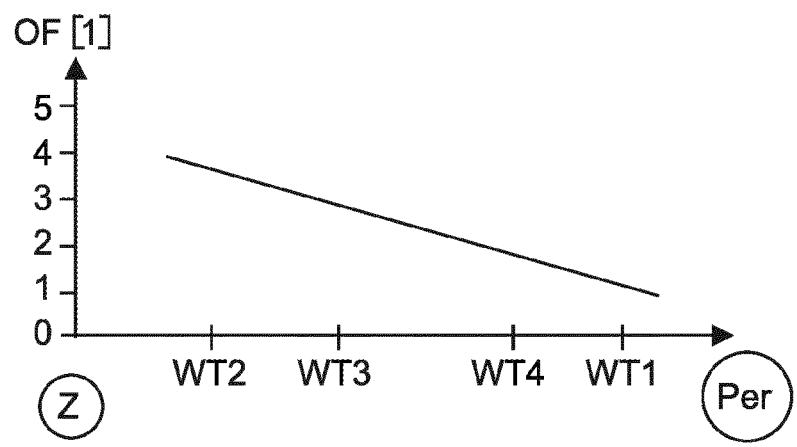
FIG. 7 shows a graph for illustrating a location property, which indicates a measure of how centrally or decentrally a wind power installation is arranged, with reference to the grid structure of FIG. 6.

A location property or, as a value, a location factor OF can accordingly be specified, which forms a function depending on how centrally or decentrally a feed-in point is arranged. This has been illustrated in FIG. 7. FIG. 7 proposes a location factor OF, which can assume values of 1 to 4, for example. Other value ranges can also be used or a measure of 0% to 100% can be used, for example. The high value of 4 indicates here a very central position of a grid connection point and the value 1 indicates a very decentral position of the grid connection point. The wind turbine WT2 can accordingly be associated with a high location factor, that is to say a location property with a large value, and the wind turbine WT1 can accordingly be associated with a lower location factor, that is to say a location property with a low value.

The further wind turbines WT3 and WT4 of FIG. 6 lie within these two extreme values. The wind turbine WT3 is more decentral than the wind turbine WT2, but is more central than the wind turbine WT1 because it feeds into the same medium-voltage grid to which the town 56 is also connected. The wind turbine WT4 is in this respect more decentral still than the wind turbine WT3 but more central than the wind turbine WT1 because the wind turbine WT1 feeds into a medium-voltage grid to which a locality 58 is connected, whereas the wind turbine WT4 feeds into a medium-voltage grid to which two localities 58 are connected. This result is accordingly indicated in FIG. 7, with the result that the wind turbine WT2 is the most central and the arrangement becomes ever more decentral via the wind turbine WT3, then the wind turbine WT4 up to the wind turbine WT1. The location factors OF also accordingly decrease in this direction.

This classification or this evaluation can preferably be used in order to select delays of different extents. For a particularly centrally arranged wind turbine like the wind turbine WT2, a particularly great delay can be provided. In relation to a delay function of the first order in accordance with FIG. 5, a particularly large time constant $T_{PT1}$ can be selected therefor. Accordingly, in the case of a change in the grid voltage, the proposed reference system would be made to track at a particularly large distance, which can lead to a large instantaneous reserve or the feeding-in of a large instantaneous reserve. Accordingly, a wind power installation located decentrally can manage with a smaller delay and a smaller time constant $T_{PT1}$ can thus be selected when a realization by means of such a delay function of the first order is performed.

In particular, for providing the required energy for such an instantaneous reserve, it may be advantageous to operate the wind power installation at a higher rotational speed or at least to permit a greater rotational speed band in order that a correspondingly large amount of rotation energy can be provided. For each wind power installation, there is usually an optimum rotational speed at each operating point, particularly at each wind speed; even when in actual fact the setting does not take place by means of measuring the wind speed, this can still serve for explanation.

Nevertheless, a wind power installation can be operated almost optimally at a higher or a lower rotational speed without large losses or large loads having to be accepted. When a wind power installation is thus intended to provide a particularly large instantaneous reserve, such as, for example, the wind turbine WT2 of FIG. 6, this can be achieved through rotation energy in the rotors of the wind power installation. If the rotational speed is increased, for example, by 10%, approximately 20% more rotation energy is already present in physical terms as a result. However, considering only the withdrawable rotation energy, since it is expedient to withdraw only so much rotation energy that the installation continues to run after that, such an increase, mentioned by way of example, in the rotational speed by 10% relative to the withdrawable rotation energy can achieve a still much higher energy provision than the mentioned 20%.

For implementation, a wind power installation can select an appropriate rotational speed characteristic curve from different possible rotational speed characteristic curves, namely one with a higher rotational speed if this is desired, such as, for example, for the wind turbine WT2.

Figure 8:
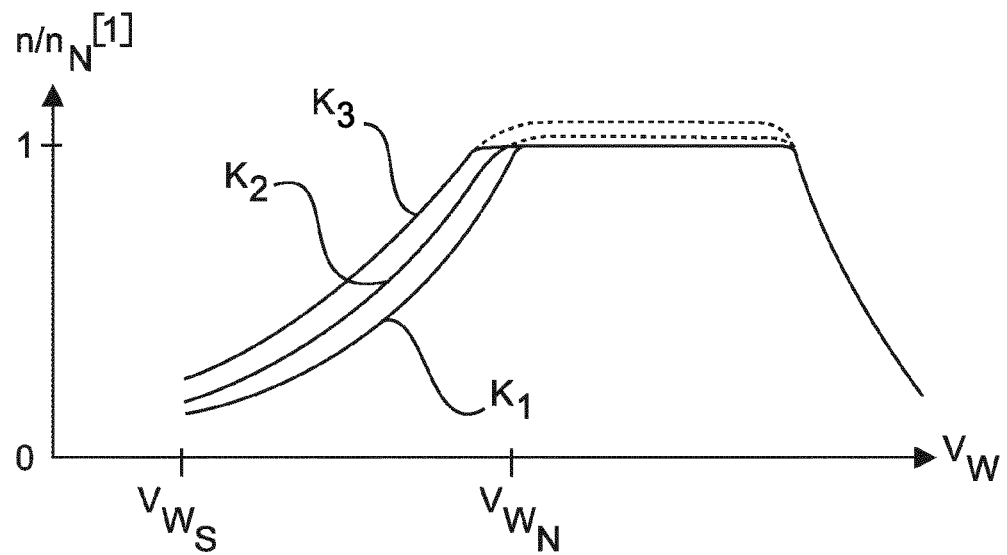
FIG. 8 illustrates different rotational speed characteristic curves.

Different rotational speed characteristic curves of this kind are illustrated in FIG. 8. Three rotational speed characteristic curves $K_1$, $K_2$, and $K_3$ are plotted there by way of example. However, said FIG. 8 serves purely for illustration, since rotational speed-power characteristic curves are usually stored in a wind power installation but no rotational speed-wind speed characteristic curves. In the part-load range, namely the range in which the wind power installation can still not deliver full power and which lies between the starting wind speed $V_{WS}$ and the rated wind speed $V_{WN}$ in FIG. 8, each wind speed can also have an associated power assuming optimum stationary operation. In any case, in said part-load range, different characteristic curves $K_1$, $K_2$, or $K_3$ can be selected depending on whether a higher rotational speed for providing a higher amount of energy is desired.

When the rated rotational speed $n_N$ is reached at the rated wind speed $V_{VN}$ or earlier, a higher rotational speed cannot usually be used as the rated rotational speed for reasons of installation safety. However, in exceptional cases, particularly when grid support is envisaged at short notice, a higher rotational speed could be considered. This is indicated in FIG. 8 by dotted characteristic curves in the range after the rated wind speed $V_{WN}$.

Figure 9:
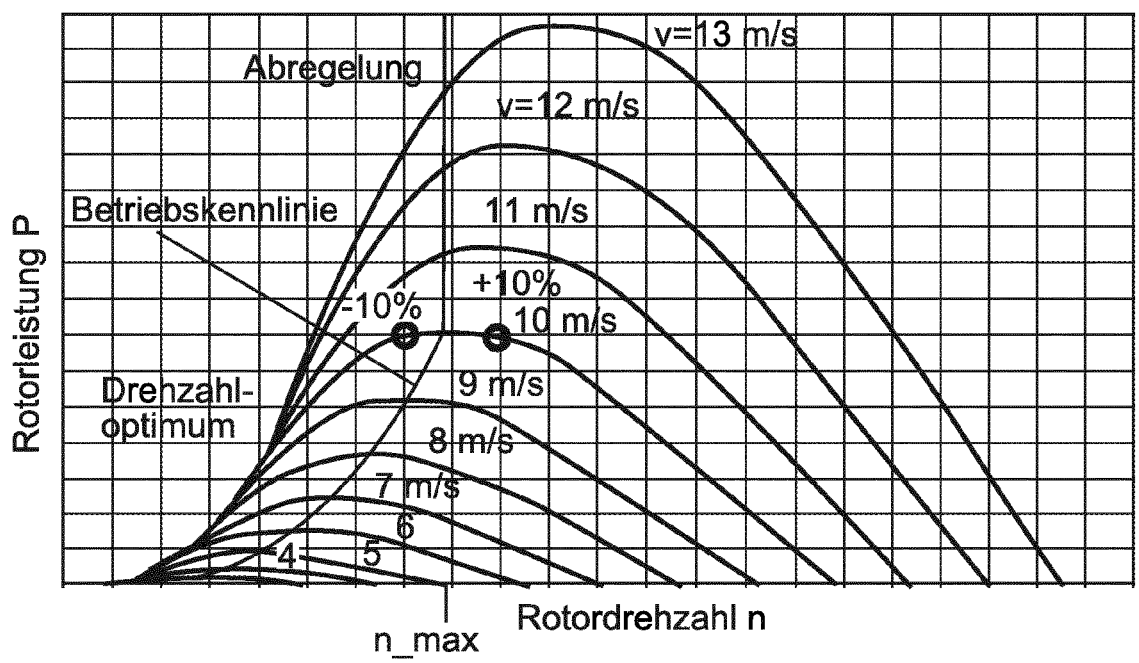
FIG. 9 illustrates correlations between rotational speed and power.

FIG. 9 shows a family of power-rotational speed curves, namely power-rotational speed curves for different wind speeds from 3 m/s to 13 m/s. The illustration is purely schematic, without numerical values. A normalization in each case to the rated rotational speed or the rated power of the rotor could be inferred.

It can initially be seen that the power P, which is plotted in each of the curves depending on the rotational speed n, increases with the rotational speed up to a maximum. This is the performance optimum. For wind speeds of 3 to 10 m/s, this optimum is indicated by an operating characteristic curve that cuts the family of curves. In the case of the curve for 10 m/s, said operating characteristic curve reaches the maximum rotational speed and until then thus indicates the rotational speed optimum. For higher wind speeds, the rotational speed optimum is above the maximum rotational speed, which is indicated as n_max. The operating characteristic curve therefore runs from the power-rotational speed curve for 10 m/s perpendicularly upward because the installation is then curtailed in relation to the rotational speed.

By way of example, in the power-rotational speed curve for 10 m/s, two operating points that deviate from the operating characteristic curve are plotted, said operating points being located below and above the optimum rotational speed by approximately 10%. It can be seen that said rotational speed deviation from the optimum rotational speed leads only to a substantially lower reduction in the power. These two deviating operating points can indicate a rotational speed band in which the wind power installation can operate in order to provide instantaneous reserve. This rotational speed band can preferably be selected with a different width depending on boundary conditions for different wind power installations, for different grid connection points and/or for different situations.

The proposed solution thus provides possibilities for setting the flow of power. This includes the immediate, that is to say instantaneous, reaction that can be achieved by said solution. In this case, a voltage-influencing system is preferably taken as a basis. A converter or inverter generates voltage according to an internal reference and a flow of power is set via the voltage amplitude and phase angle between said output voltage at the converter, that is to say the converter voltage, and the grid voltage. However, a current-influencing converter can alternatively also be used.

A measurement of the grid frequency can be sufficient for the first synchronization, as has been explained in connection with the start-up section 10 of FIG. 3.

In principle, a regulator tracks both variables, namely voltage and frequency, in the converter in order to set operating points for active and reactive power. Tracking by the reference system is provided for this. The phase angle and the voltage amplitude are accordingly regulated.

An event in the grid, such as, for example, a phase jump or a change in the frequency over time, leads to an immediate, that is to say instantaneous, reaction because the voltage and frequency at the converter do not change immediately and other currents are set immediately. The voltage and frequency at the converter or inverter are namely initially forwarded unchanged with the reference system. Delayed tracking consequently leads to the provision of instantaneous reserve.

Figure 10:
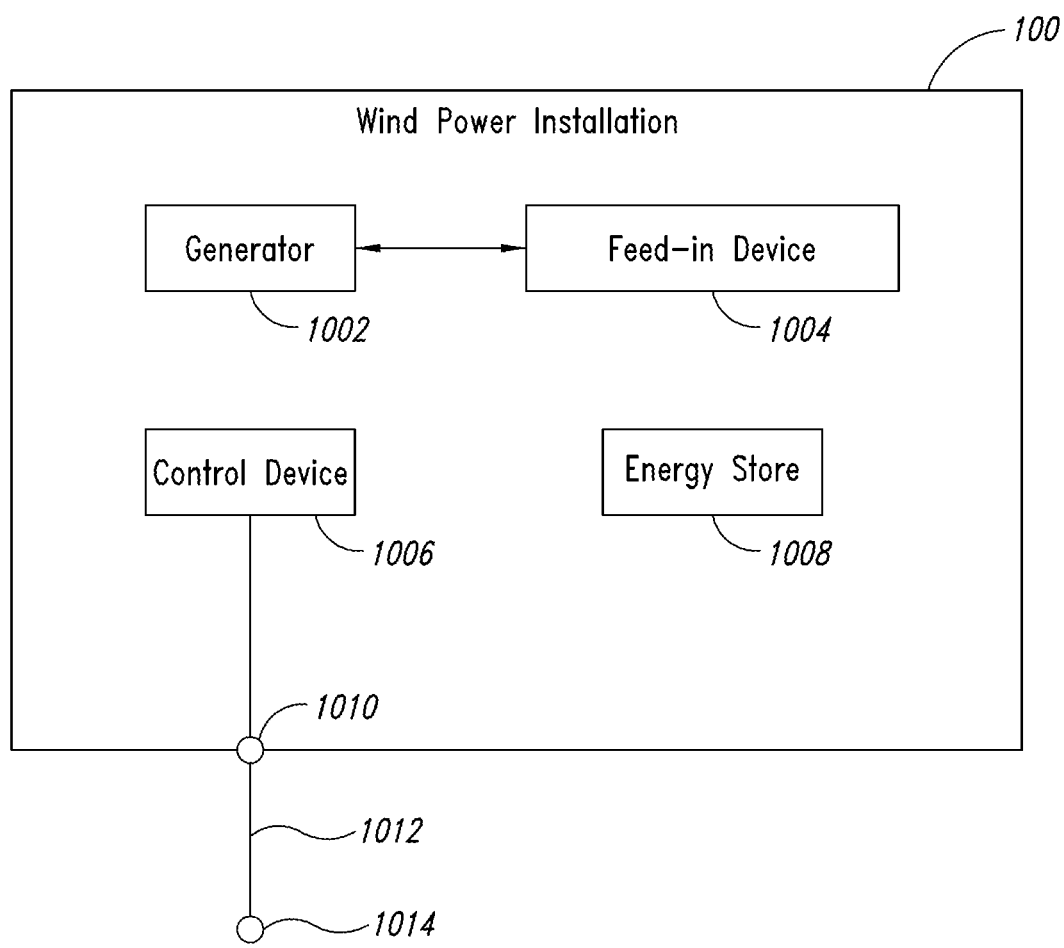
FIG. 10 shows a block diagram of the wind power installation.

FIG. 10 shows a block diagram of the wind power installation 100. The wind power installation 100 includes a generator 1002, a feed-in device 1004, a control device 1006, an energy store 1008 and a data connection 1010.

The feed-in device 1004 may be any device configured to feed power into an electrical supply grid. For example, the feed-in device 1004 may include an inverter for feeding the power into the electrical supply grid.

The control device 1006, which may be a processor, a controller, a microprocessor, or microcontroller, among others, may be any type of device configured to perform computational operations. The control device 1006 may be a computer or server, among others. Although the control device 1006 is shown to be part of the wind power installation 100 and local to the wind power installation 100, in various embodiments, the control device 1006 may be remote and may be located in a control room or data center, among others. For example, the control device 1006 may include a central processing unit (CPU) or an arithmetic logic unit (ALU) that is configured to perform the operations and techniques described herein.

The control device may include the reference specification device, phase angle specification device, calculation device, the feed-in device, the tracking device, the coordination device, the determination device and the specification device described herein, whereby all the devices may be part of a same control device or separate control devices. The functionality and operations described herein as being performed by the devices may be performed by the same control device or separate or different control devices.

The data connection 1010 may be any type of port or interface configured to transmit or receive data over a data transmission line 1012. The data connection 1010 may transmit data in accordance with any wired or wireless communications protocol. The data connection 1010 may transmit the data to or receive the data from another data connection 1014 (for example, of another wind power installation).

The invention claimed is:

1. A method for feeding electrical power, by at least one wind power installation or a power plant, into an electrical supply grid having a grid voltage and an associated grid frequency at a grid connection point, the method comprising:
   specifying a reference system including a reference frequency, a reference phasor having a reference angle, and a reference amplitude of an output voltage to be generated, wherein the reference angle revolves at the reference frequency and the reference frequency substantially corresponds to the grid frequency,
   specifying a phase angle between the output voltage and the grid voltage,
   determining a feed-in angle, which revolves with the reference angle, from the specified phase angle, wherein when the reference frequency corresponds to the grid frequency, the specified phase angle becomes a phase angle between the output voltage generated at the feed-in angle and the grid voltage,
   generating the output voltage having a voltage amplitude that depends on the reference amplitude, a frequency that depends on the reference frequency, and the feed-in angle, and
   performing delay tracking of the reference system by at least causing the reference system to track a behavior of the grid voltage in a delayed manner, wherein causing the reference system to track the behavior of the grid voltage in the delayed manner includes:
   causing the reference amplitude to track the grid voltage in a delayed manner, or
   causing the reference frequency to track the grid frequency in a delayed manner, wherein causing the reference frequency to track the grid frequency in the delayed manner includes:
      detecting a phase angle between the generated output voltage and the grid voltage,
      determining a difference between the specified phase angle and the detected phase angle,
      changing the reference angle to reduce the difference according to a magnitude using a delay function, and adjusting the reference frequency to the changed reference angle.

2. The method as claimed in claim 1, comprising:
causing the reference system to track the behavior of the grid voltage using predetermined delay dynamics.

3. The method as claimed in claim 2, wherein:
the predetermined delay dynamics or the delay tracking are set based on the grid connection point, or
additional power or resulting excess power from rotation energy required for delayed tracking is offset or stored as rotation energy or is taken from an energy store or is stored in the energy store.

4. The method as claimed in claim 2, wherein the predetermined delay dynamics include a delay function, and wherein the delay function is a pt1 function or a pt2 function having a non-overshooting step response.

5. The method as claimed in claim 4, comprising:
generating an output voltage that produces a current fed-in to the electrical supply grid, and
selecting the delay function or delay dynamics such that when at least one state in the electrical supply grid changes:
  a generation of the output voltage initially remains substantially unchanged, and
  a resulting change of the fed-in current is initially not substantially counteracted, and according to the selecting of the delay function or delay dynamics, the method reacts to the change in the at least one state in the electrical supply grid immediately with a changed fed-in current.

6. The method as claimed in claim 1, comprising:
before performing delay tracking of the reference system, setting the reference frequency to the grid frequency.

7. The method as claimed in claim 1, wherein:
performing delay tracking of the reference system includes making the reference system track the grid voltage and deviate from the grid voltage in at least one variable at least by a predetermined minimum deviation, and
performing normal operations when the reference system does not track the grid voltage or does not deviate from the grid voltage in the at least one variable at least by the predetermined minimum deviation,
wherein a limit value specified for the normal operations may be exceeded by a predetermined tolerance value in a tracking operation.

8. The method as claimed in claim 7, wherein at least one overshoot is permitted during normal operations from a list including:
the specified limit value is a maximum feed-in current and the predetermined minimum deviation is at least 10% of the maximum feed-in current,
the specified limit value is a maximum power to be fed in and the predetermined minimum deviation is at least 10% of the maximum power to be fed in,
the specified limit value is a maximum permissible temperature in an inverter that generates the output voltage and the predetermined minimum deviation is at least 10 kelvin,
the specified limit value is a maximum permissible value of an integral of the temperature over a predetermined time and the predetermined minimum deviation is at least 10 kelvin*second, and
the specified limit value is a maximum change in frequency and the predetermined minimum deviation is at least 0.5 Hz/s.

9. The method as claimed in claim 1, wherein:
the electrical supply grid is associated with a nominal frequency,
the reference frequency is made to track the grid frequency independently of whether the grid frequency approaches or diverges from the nominal frequency, wherein
tracking the reference frequency is delayed to a greater extent when the grid frequency diverges from the nominal frequency than when the grid frequency approaches the nominal frequency.

10. The method as claimed in claim 1, comprising:
setting the reference frequency to a value between the grid frequency and a nominal frequency of the electrical supply grid, and
compensating for a deviation between the reference system and the grid voltage by changing a feed-in current to the electrical supply grid.

11. The method as claimed in claim 1, comprising:
controlling a plurality of wind power installations connected to the electrical supply grid at a plurality of grid connection points for feeding in electrical power at at least the grid connection point of the plurality of grid connection points.

12. The method as claimed in claim 11, comprising:
determining, for each of the plurality of grid connection points, a location property, the location property being a measure of a functional position of the grid connection point in relation to a coupling strength of the respective grid connection point for the electrical supply grid, wherein the location property is indicative of a strength of a coupling between the grid connection point and the electrical supply grid,
specifying at least one operating setting of a wind power installation of the plurality of wind power installations based on the location property of the grid connection point using which the one wind power installation feeds in electrical power.

13. The method as claimed in claim 12, wherein specifying the at least one operating setting includes at least one of:
specifying a rotational speed characteristic curve based on the location property, wherein a higher rotational speed is higher corresponds to stronger coupling between the grid connection point and the electrical supply grid,
specifying a permissible rotational speed band in which the rotational speed is varied to provide or deliver rotation energy, wherein a wider rotational speed band corresponds to stronger coupling between the grid connection point and the electrical supply grid,
selecting delay dynamics for performing delay tracking based on the location property, wherein the greater the delay, the more strongly the grid connection point is coupled to the electrical supply grid,
providing stored energy based on the location property, wherein the greater the stored energy, the more strongly the grid connection point is coupled to the electrical supply grid and
providing an energy store based on the location property, wherein the greater a size of the energy store, the more strongly the grid connection point is coupled to the electrical supply grid.

14. The method as claimed in claim 11, wherein the plurality of wind power installations that feed into the electrical supply grid via the plurality of different grid connection points are connected via a data connection, wherein the data connection is configured to at least:

transmit control data for coordinating the feeding in at the plurality of different grid connection points, transmit control data for coordinating selection of tracking dynamics of the plurality of wind power installations of the plurality of grid connection points, and plurality of specifying different tracking dynamics for the plurality of wind power installations of the plurality of grid connection points.

15. A wind power installation for feeding electrical power into an electrical supply grid having a grid voltage having an associated grid frequency at a grid connection point, comprising:

a rotor having a plurality of rotor blades, a generator for generating electrical power from wind, a control device configured to:

set a reference system having a reference frequency, a reference phasor having a reference angle, and a reference amplitude of an output voltage to be generated, wherein the reference angle revolves at the reference frequency and the reference frequency substantially corresponds to the grid frequency, set a phase angle between the output voltage and the grid voltage, and determine a feed-in angle, which revolves with the reference angle, from the set phase angle, such that the set phase angle becomes a phase angle between the output voltage generated at the feed-in angle and the grid voltage when the reference frequency corresponds to the grid frequency, and a feed-in device including at least one frequency inverter for generating the output voltage having a voltage amplitude that depends on the reference amplitude, a frequency that depends on the reference frequency and the feed-in angle for feeding the generated power into the electrical supply grid, and wherein the control device is configured to perform delayed tracking, by the reference system, of a behavior of the grid voltage includes:

causing the reference amplitude to track the grid voltage in a delayed manner, or causing the reference frequency to track the grid frequency in a delayed manner, wherein causing the reference frequency to track the grid frequency in the delayed manner includes:

detecting a phase angle between the generated output voltage and the grid voltage, determining a difference between the specified phase angle and the detected phase angle, changing the reference angle to reduce the difference according to a magnitude using a delay function, and adjusting the reference frequency to the changed reference angle.

16. The wind power installation as claimed in claim 15, comprising:

at least one energy store configured to store additional power or resulting excess power for the delayed tracking.

17. The wind power installation as claimed in claim 15, comprising:

a data transmission device configured to exchange data via a data connection with at least one further wind power installation that feeds into the electrical supply grid via a further grid connection point, and wherein the control device is configured to coordinate the feeding electrical power of the wind power installation with a another feeding of another electrical power of the at least one further wind power installation.

18. A wind farm including a plurality of wind power installations feeding into the electrical supply grid via a common grid connection point, wherein the wind farm includes the wind power installation as claimed in claim 15.

19. The wind power installation as claimed in claim 18, wherein the control device is configured to:

determine or input a location property for each of a plurality of grid connection points as a measure of a functional position of the grid connection point in relation to a center and a periphery of the electrical supply grid, wherein the location property indicates how centrally or decentrally the grid connection point is arranged in the electrical supply grid, and specify at least one operating setting of at least one of the plurality of wind power installations based on the location property of the grid connection point of the plurality of grid connection points via which the at least one of the plurality of wind power installations feeds in power.

20. An arrangement of a plurality of wind power installations or a plurality of wind farms, including the wind power installation as claimed in claim 18, for feeding electrical power into the electrical supply grid at a plurality of grid connection points, comprising at least one data transmission device for exchanging data via a data connection between the plurality of wind power installations or wind farms that feed into the electrical supply grid at the plurality of grid connection points.

21. The arrangement as claimed in claim 20, wherein:

a location property is determined or specified for each of the plurality of grid connection points as a measure of a functional position of a grid connection point of the plurality of grid connection points in relation to a center and a periphery of the electrical supply grid, wherein the location property indicates how centrally or decentrally the grid connection point is arranged in the electrical supply grid, and a plurality of energy stores are provided at a plurality of the grid connection points based on the location property, wherein the larger the size of an energy store of a respective grid connection point, the more centrally the grid connection point is arranged in the electrical supply grid.

22. A method for feeding electrical power, by at least one wind power installation or a power plant, into an electrical supply grid having a grid voltage and an associated grid frequency at a grid connection point, the method comprising:

specifying a reference system including a reference frequency, a reference phasor having a reference angle, and a reference amplitude of an output voltage to be generated, wherein the reference angle revolves at the reference frequency and the reference frequency substantially corresponds to the grid frequency, specifying a phase angle between the output voltage and the grid voltage, determining a feed-in angle, which revolves with the reference angle, from the specified phase angle, wherein when the reference frequency corresponds to the grid frequency, the specified phase angle becomes a phase angle between the output voltage generated at the feed-in angle and the grid voltage, generating the output voltage having a voltage amplitude that depends on the reference amplitude, a frequency that depends on the reference frequency, and the feed-in angle, performing delay tracking of the reference system by at least causing the reference system to track a behavior of the grid voltage in a delayed manner, controlling a plurality of wind power installations connected to the electrical supply grid at a plurality of grid connection points for feeding in the electrical power at at least the grid connection point of the plurality of grid connection points, determining, for each of the plurality of grid connection points, a location property, the location property being a measure of a functional position of the grid connection point in relation to a coupling strength of the respective grid connection point for the electrical supply grid, wherein the location property is indicative of a strength of a coupling between the grid connection point and the electrical supply grid, and specifying at least one operating setting of a wind power installation of the plurality of wind power installations based on the location property of the grid connection point using which the wind power installation feeds in electrical power.

23. The method as claimed in claim 22, comprising:
causing the reference system to track the behavior of the grid voltage using predetermined delay dynamics.

* * * * *